United States Patent
Wei et al.

(10) Patent No.: US 10,128,941 B2
(45) Date of Patent: Nov. 13, 2018

(54) DIMMING CONTROL FOR ORTHOGONAL FREQUENCY DIVISION MULTIPLEXING-BASED VISIBLE LIGHT COMMUNICATION

(71) Applicant: Futurewei Technologies, Inc., Plano, TX (US)

(72) Inventors: Dong Wei, Austin, TX (US); Shun Lou, Hefei (CN); Chen Gong, Hefei (CN); Nan Wu, Hefei (CN); Zhengyuan Xu, Hefei (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/911,351

(22) Filed: Mar. 5, 2018

(65) Prior Publication Data

US 2018/0302157 A1 Oct. 18, 2018

Related U.S. Application Data

(60) Provisional application No. 62/484,488, filed on Apr. 12, 2017.

(51) Int. Cl.
| | | |
|---|---|---|
| *H04B 10/079* | (2013.01) | |
| *H04J 14/02* | (2006.01) | |
| *H04L 27/36* | (2006.01) | |
| *H04B 10/516* | (2013.01) | |
| *H04L 27/26* | (2006.01) | |
| *H04B 10/116* | (2013.01) | |
| *H04B 10/564* | (2013.01) | |

(52) U.S. Cl.
CPC .  *H04B 10/07953* (2013.01); *H04B 10/07955* (2013.01); *H04B 10/116* (2013.01);
(Continued)

(58) Field of Classification Search
CPC ............ H04B 10/07953; H04B 10/116; H04B 10/5161; H04B 10/07955; H04B 10/564;
(Continued)

(56) References Cited

U.S. PATENT DOCUMENTS

| | | | |
|---|---|---|---|
| 2015/0318925 A1* | 11/2015 | Tsonev | H04B 10/116 398/79 |
| 2015/0372753 A1 | 12/2015 | Jovicic et al. | |
| 2016/0134366 A1* | 5/2016 | Elgala | H04B 10/116 398/130 |

FOREIGN PATENT DOCUMENTS

| | | |
|---|---|---|
| CN | 104320189 A | 1/2015 |
| CN | 106464368 A | 2/2017 |
| WO | 2015047497 A2 | 4/2015 |

OTHER PUBLICATIONS

Breslin, website, https://technologyvoice.com/2011/08/12/visible-light-communications-a-greener-broader-spectrum-for-data-transfer/, Aug. 12, 2011.*

(Continued)

*Primary Examiner* — Leslie C Pascal
(74) *Attorney, Agent, or Firm* — Conley Rose, P.C.

(57) ABSTRACT

A method of dimming control for orthogonal frequency division multiplexing (OFDM)-based visible light communication (VLC). The method includes transmitting, by an optical communication device, an optical signal using OFDM with all active sub-carriers when a first dimming level is observed, transmitting, by the optical communication device, the optical signal using OFDM with a first subset of active sub-carriers and without sub-carrier index modulation (SIM) when a second dimming level is observed, wherein the second dimming level is less than the first dimming level; and transmitting, by the optical communication device, the optical signal using OFDM with a second subset of active sub-carriers and with SIM when a third dimming level is observed, wherein the second subset of the active sub-carriers is smaller than the first subset of the active sub-carriers, and wherein the third dimming level is less than the second dimming level.

20 Claims, 6 Drawing Sheets

(52) U.S. Cl.
CPC ....... *H04B 10/5161* (2013.01); *H04B 10/564* (2013.01); *H04J 14/0298* (2013.01); *H04L 27/2627* (2013.01); *H04L 27/364* (2013.01)

(58) Field of Classification Search
CPC . H04L 27/2627; H04L 27/364; H04J 14/0298
USPC ........................................................ 398/172
See application file for complete search history.

(56) References Cited

OTHER PUBLICATIONS

Machine Translation and Abstract of Chinese Publication No. CN104320189, Jan. 28, 2015, 28 pages.
Foreign Communication From a Counterpart Application, PCT Application No. PCT/CN2018/082827, English Translation of International Search Report dated Jun. 27, 2018, 5 pages.
Foreign Communication From a Counterpart Application, PCT Application No. PCT/CN2018/082827, English Translation of Written Opinion dated Jun. 27, 2018, 5 pages.
Tsonev, et al., "Enhanced Subcarrier Index Modulation (SIM) OFDM," Enabling Green Wireless Multimedia Commuications, IEEE, 2011, pp. 728-732.
Dissanayake, et al., "Comparison of ACO-OFDM, DCO-OFDM and ADO-OFDM in IM/DD Systems," Journal of Lightwave Technology, vol. 31, No. 7, Apr. 1, 2013, pp. 1063-1072.
Abu-alhiga, et al., "Subcarrier-Index Modulation OFDM," IEEE, 2009, pp. 177-181.

\* cited by examiner

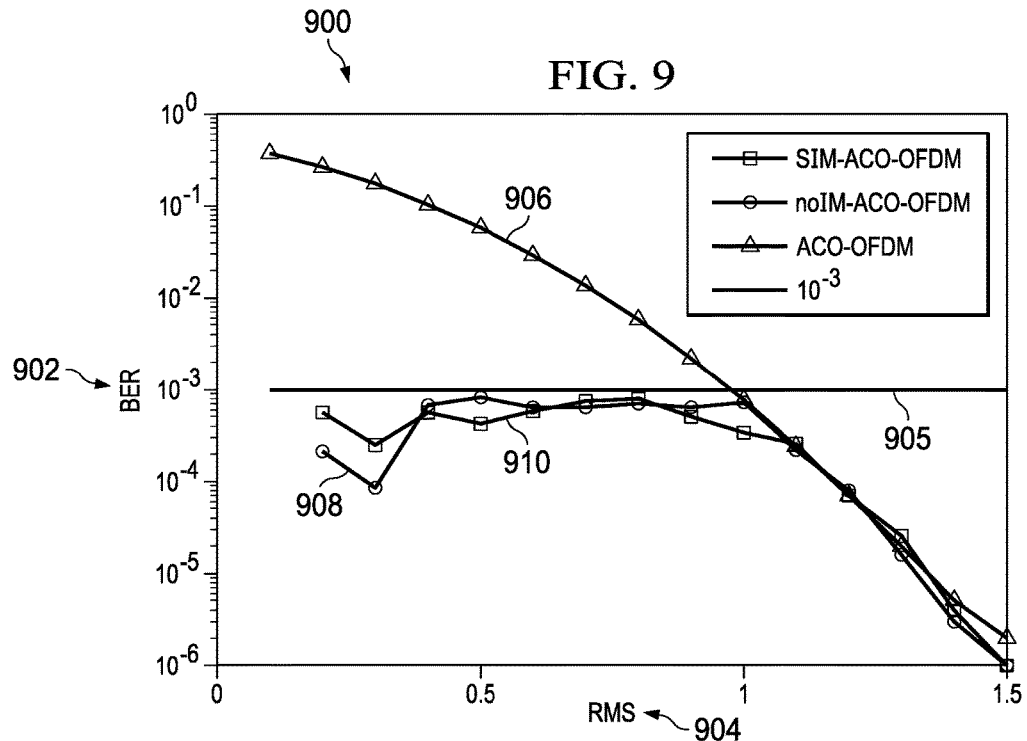
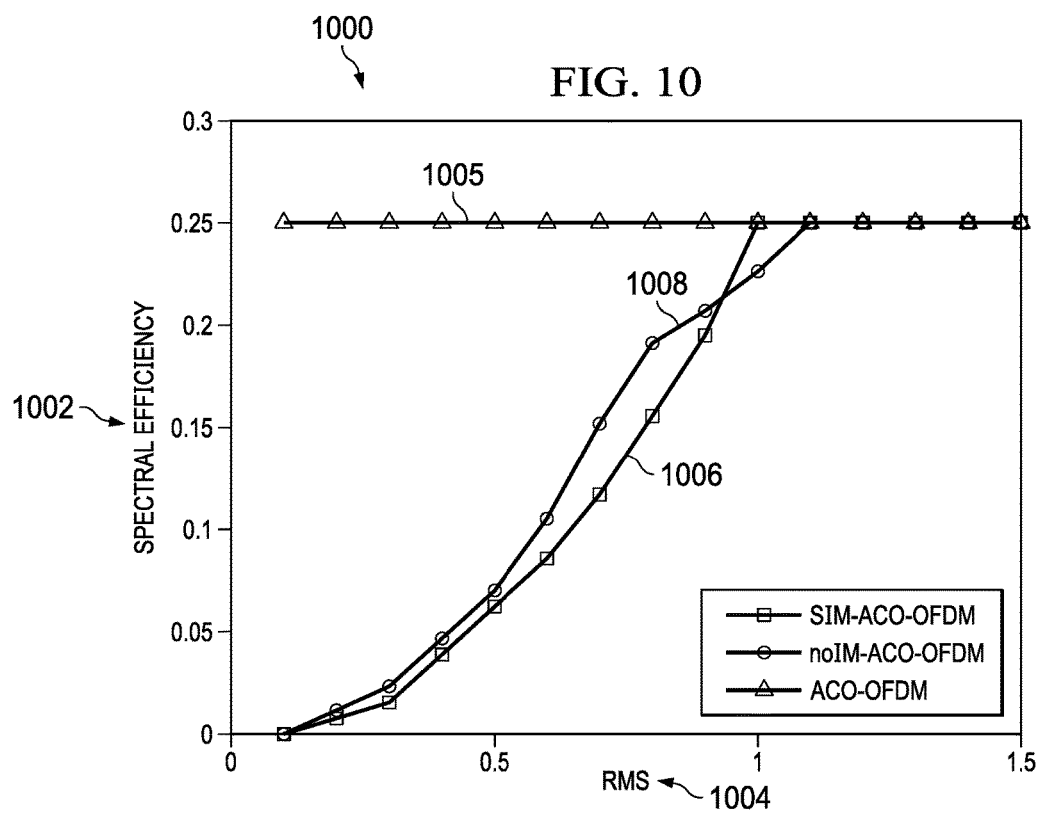

DIMMING CONTROL FOR ORTHOGONAL FREQUENCY DIVISION MULTIPLEXING-BASED VISIBLE LIGHT COMMUNICATION

CROSS-REFERENCE TO RELATED APPLICATIONS

This patent application claims the benefit of U.S. Provisional Patent Application No. 62/484,488, filed Apr. 12, 2017, by Dong Wei, et al., and titled "A Method of Dimming Control for Orthogonal Frequency Division Multiplexing-based Visible Light Communication," the teachings and disclosure of which is hereby incorporated in its entireties by reference thereto.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advancements in solid-state lighting have enabled a light-emitting diode (LED) to switch to different light intensity levels at a rate which is fast enough to be imperceptible to the human eye. Therefore, this functionality can be used for visible light communication (VLC) where data is encoded in the emitting light in various ways.

A photodetector (a.k.a., a light sensor or a photodiode) or an image sensor (e.g., a matrix of photodiodes) is able to receive modulated optical signals and decode the data therein. As such, LEDs are able to serve the dual purpose of providing illumination and facilitating the communication of data.

SUMMARY

In an embodiment, the disclosure includes a method of dimming control for orthogonal frequency division multiplexing (OFDM)-based visible light communication (VLC). The method includes transmitting, by an optical communication device, an optical signal using OFDM with all active sub-carriers when a first dimming level is observed; transmitting, by the optical communication device, the optical signal using OFDM with a first subset of active sub-carriers and without sub-carrier index modulation (SIM) when a second dimming level is observed, wherein the second dimming level is less than the first dimming level; and transmitting, by the optical communication device, the optical signal using OFDM with a second subset of active sub-carriers and with SIM when a third dimming level is observed, wherein the second subset of the active sub-carriers is smaller than the first subset of the active sub-carriers, and wherein the third dimming level is less than the second dimming level.

Optionally, in any of the preceding aspects, another implementation of the aspect provides that the optical communication device comprises a dimmable light-emitting diode (LED). Optionally, in any of the preceding aspects, another implementation of the aspect provides that the OFDM comprises asymmetrically clipped optical (ACO)-OFDM. Optionally, in any of the preceding aspects, another implementation of the aspect provides that the first subset of the active sub-carriers comprises a maximum number of active sub-carriers ($n_a$). Optionally, in any of the preceding aspects, another implementation of the aspect provides that the second subset of the active sub-carriers comprises an equivalent number of sub-carriers ($n_e$).

In an embodiment, the disclosure includes a method of dimming control for orthogonal frequency division multiplexing (OFDM)-based visible light communication (VLC). The method includes determining a root mean square (RMS) of a signal power for each sub-carrier of an optical signal based on an observed dimming level; determining a maximum number of active sub-carriers ($n_a$) using the RMS of the signal power for a given bit error rate (BER) and a given quadrature amplitude modulation (QAM) size; transmitting the optical signal using OFDM with all the active sub-carriers when a total number of sub-carriers (n) is not greater than the maximum number of active sub-carriers ($n_a$); determining an equivalent number of sub-carriers ($n_e$) assuming use of sub-carrier index modulation (SIM) when the total number of sub-carriers (n) is greater than the maximum number of active sub-carriers ($n_a$); transmitting the optical signal using OFDM with the maximum number of active sub-carriers ($n_a$) and without SIM when the equivalent number of sub-carriers ($n_e$) is greater than the maximum number of active sub-carriers ($n_a$); and transmitting the optical signal using OFDM with SIM when the equivalent number of sub-carriers ($n_e$) is less than the maximum number of active sub-carriers ($n_a$).

Optionally, in any of the preceding aspects, another implementation of the aspect provides that the maximum number of active sub-carriers ($n_a$) is determined according to:

$$n_a = \min\left\{\left[\frac{r^2 n}{2N_0 \gamma}\right], n\right\}$$

where r is a RMS of the signal power, n is total number of sub-carriers, $N_0$ is a noise power, and $\gamma$ is a signal to noise ratio (SNR) threshold for the given BER. Optionally, in any of the preceding aspects, another implementation of the aspect provides that the equivalent number of sub-carriers ($n_e$) is determined according to:

$$n_e = n_I + \frac{b_I}{\log_2(M)}$$

where $n_I$ is an increased number of active sub-carriers in OFDM with SIM, $b_I$ is an increased bitrate due to SIM, and M is a QAM size. Optionally, in any of the preceding aspects, another implementation of the aspect provides that the increased number of active sub-carriers in OFDM with SIM is determined according to:

$$n_I = \min\left\{\left[\frac{r^2 n}{2N_0 \gamma_I}\right], n\right\}$$

where r is a RMS of the signal power, n is the total number of sub-carriers, $N_0$ is a noise power, and $\gamma_I$ is an increased SNR threshold.

Optionally, in any of the preceding aspects, another implementation of the aspect provides that the signal power for each sub-carrier of the optical signal is determined according to:

$$\sigma^2 = \frac{r^2 n}{2n_a}$$

where r is a RMS of the signal power, n is a number of all sub-carriers, and $n_a$ is the maximum number of active sub-carriers.

Optionally, in any of the preceding aspects, another implementation of the aspect provides that only the active sub-carriers carry bits of data. Optionally, in any of the preceding aspects, another implementation of the aspect provides that the OFDM used for transmission of the optical signal comprises asymmetrically clipped optical (ACO)-OFDM. Optionally, in any of the preceding aspects, another implementation of the aspect provides that the optical signal is transmitted by a dimmable light-emitting diode (LED).

Optionally, in any of the preceding aspects, another implementation of the aspect provides identifying, for a receiver configured to receive the optical signal, a number of the active sub-carriers being used.

In an embodiment, the disclosure includes and optical transmission apparatus. The optical transmission apparatus includes a processor configured to: determine a root mean square (RMS) of a signal power for each sub-carrier of an optical signal based on an observed dimming level; determine a maximum number of active sub-carriers ($n_a$) using the RMS of the signal power for a given bit error rate (BER) and a given quadrature amplitude modulation (QAM) size; and determine an equivalent number of sub-carriers ($n_e$) assuming use of sub-carrier index modulation (SIM) when a total number of sub-carriers (n) is greater than the maximum number of active sub-carriers ($n_a$); and a transmitter coupled to the processor, the transmitter configured to: transmit the optical signal using orthogonal frequency division multiplexing (OFDM) with all the active sub-carriers when the total number of sub-carriers (n) is not greater than the maximum number of active sub-carriers ($n_a$); transmit the optical signal using OFDM with the maximum number of active sub-carriers ($n_a$) and without SIM when the equivalent number of sub-carriers ($n_e$) is greater than or equal to the maximum number of active sub-carriers ($n_a$); and transmit the optical signal using OFDM with SIM when the equivalent number of sub-carriers ($n_e$) is less than the maximum number of active sub-carriers ($n_a$).

Optionally, in any of the preceding aspects, another implementation of the aspect provides that the optical transmission apparatus comprises one of a visible light communication (VLC) apparatus and a dimmable light-emitting diode (LED).

Optionally, in any of the preceding aspects, another implementation of the aspect provides that the optical signal is transmitted to a photodetector, a light sensor, a photodiode, an image sensor, or a matrix of photodiodes along with an indication of a number of the active sub-carriers being used in the optical signal.

Optionally, in any of the preceding aspects, another implementation of the aspect provides that the equivalent number of sub-carriers ($n_e$) is determined according to:

$$n_e = n_I + \frac{b_I}{\log_2(M)}$$

where $n_I$ is an increased number of active sub-carriers in OFDM with SIM, $b_I$ is an increased bitrate due to SIM, and M is a QAM size s.

Optionally, in any of the preceding aspects, another implementation of the aspect provides that the increased number of active sub-carriers in OFDM with SIM is determined according to:

$$n_I = \min\left\{\left\lfloor \frac{r^2 n}{2N_0 \gamma_I} \right\rfloor, n\right\}$$

where r is a RMS of the signal power, n is the total number of sub-carriers, $N_0$ is a noise power, and $\gamma_I$ is an increased signal to noise ratio (SNR) threshold.

Optionally, in any of the preceding aspects, another implementation of the aspect provides that the total number of sub-carriers (n) is transmitted by the transmitter to a receiver when all of the sub-carriers are active, wherein the maximum number of active sub-carriers ($n_a$) is transmitted by the transmitter to the receiver when a subset of the sub-carriers is active and SIM is not used, and wherein the increased number of active sub-carriers ($n_I$) is transmitted by the transmitter to the receiver when a subset of the sub-carriers is active and SIM is used.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 9 is a graph that illustrates how BER compares to signal power.

FIG. 10 is a graph that illustrates how spectral efficiency compares to RMS of signal power for different modulation schemes.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method of dimming control for orthogonal frequency division multiplexing (OFDM)-based visible light communication.

Visible light communication (VLC) is the use of light sources for both illumination and communication. VLC generally uses fast switching light emitting diodes (LEDs) as its source and possesses the ability to simultaneously provide illumination and communication for short-range indoor links. Dimming is a feature in lighting used to meet the functional and aesthetic requirements of a space as well as to conserve energy. The brightness of an LED is adjusted by controlling the forward current through the LED. A dimmed LED produces less heat, extending the lifespan of LED light sources. Therefore, dual-function VLC systems (simultaneously providing illumination and communication) have dimming functionality. In practice, a challenge of VLC is to ensure dimming functionality while maintaining a reliable communication link.

Figure 1:
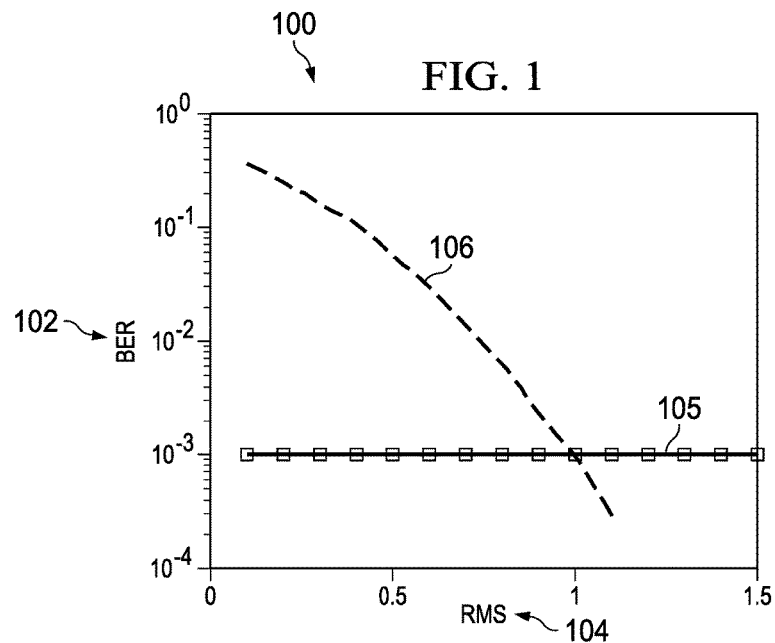
FIG. 1 is a graph that illustrates how the bit error rate (BER) varies with the root mean square (RMS) of signal power.

FIG. 1 is a graph 100 that illustrates how the bit error rate (BER) 102 varies with the root mean square (RMS) of signal power (e.g., the average power) 104. For the purpose of illustration, a baseline 105 for the BER 102 is depicted at $10^{-3}$. The curve 106 intersects the baseline 105 at an RMS of signal power 104 of about 1. The average power over all sub-carriers becomes too low to support reliable communication (i.e., resulting in large BER) when the LED light is dimmed. As will be more fully explained below, in the present disclosure the number of active sub-carriers (e.g., the sub-carriers carrying bits) is reduced to ensure that the average power over all active sub-carriers is sufficiently high for reliable communication.

Advancements in solid-state lighting have enabled LEDs to switch to different light intensity levels at a rate fast enough for the different light intensity levels to be imperceptible by a human eye. This functionality can be used for VLC where the data is encoded in the emitting light in various ways. A photodetector (a.k.a., a light sensor or a photodiode) or an image sensor (e.g., a matrix of photodiodes) is able to receive the modulated signals and decode the data. This means that the LEDs can serve the dual purpose of providing illumination as well as communication.

To make the commercial implementation of VLC feasible, the VLC has to support dimming that will provide energy savings and increase the aesthetic value of the place using this technology. The brightness of a LED is adjusted by controlling the forward current through the LED. In practice, a challenge of VLC is to ensure dimming functionality while maintaining a reliable communication link.

Demand for increased data rates across dispersive optical media leads to application of orthogonal frequency division multiplexing (OFDM) or orthogonal frequency division duplexing in VLC. In OFDM, quadrature amplitude modulation (QAM) is used on each active sub-carrier. The present disclosure considers dimming control in the frequency domain.

Figure 2:
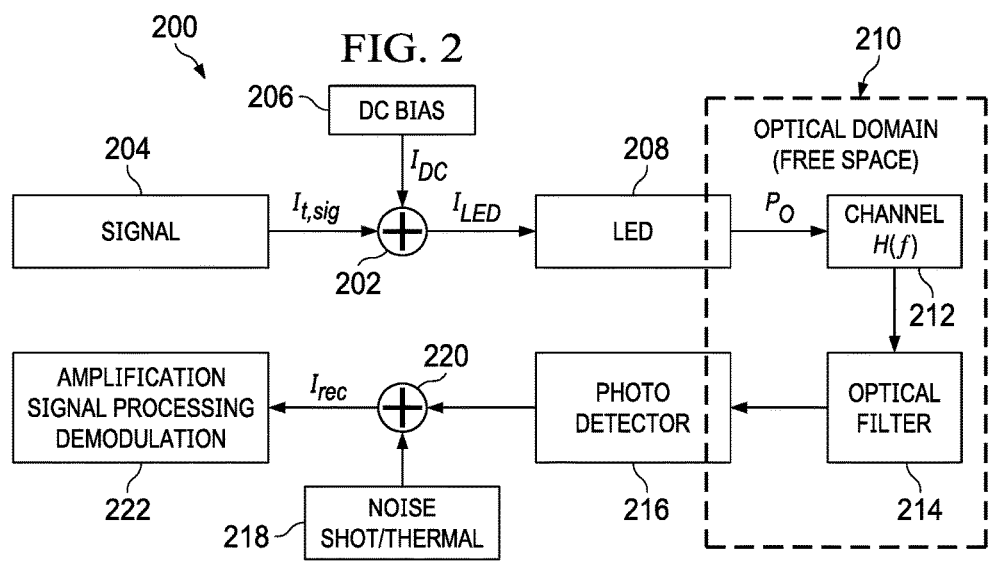
FIG. 2 illustrates an example of a visible light communication (VLC) system.

There are two types of OFDM commonly used in VLC, namely a direct-current (DC)-biased optical OFDM (DCO-OFDM) and asymmetrically clipped optical OFDM (ACO-OFDM) and its variations. FIG. 2 illustrates an example of a VLC model 200 using a DC bias. The VLC model 200 uses a summation 202 to combine a current of an optical signal 204 at a particular time ($I_{t,sig}$) with a current of a DC bias signal 206. The result of the summation 202 is a forward current ($I_{LED}$) that is fed into the LED 208. In some configurations, the LED 208 is a fast-switching dimmable LED.

The LED 208 outputs an optical signal having an optical power ($P_o$). The optical power may also be referred to as an intensity of light. As shown, the optical signal 202 is transmitted through an optical domain 210. The optical domain 210 may be free space, open air, or some other suitable medium. A channel unit 212 receives the optical signal output by the LED 208. The channel unit 212 attenuates the optical signal 202. After attenuation, the optical signal 202 is transmitted to an optical filter 214. The optical filter 214 filters out optical waveforms over a certain spectrum and then feeds the signal into the photo detector 216. The photo detector 216 converts the optical signal 202 into an electrical signal.

At summation 220, the electrical signal output by the photodetector 216 accounts for the noise 218 within in the VLC model 200. The resulting electrical signal having a current ($I_{roc}$) is subjected to amplification, signal processing, and demodulation 222. During demodulation 222, the electrical signal is demodulated in a manner consistent with OFDM and the data carried by the electrical signal is extracted.

A VLC system 200 using ACO-OFDM is described in detail in S. Dissanayake, et al., "Comparison of ACO-OFDM. DCO-OFDM and ADO-OFDM in IM/DD Systems." *Journal of Lightwave Technology*, Vol. 31, No. 7, Apr. 3, 2013, which is incorporated herein by this reference. In ACO-OFDM, only the odd sub-carriers carry data symbols, while the even sub-carriers form a bias signal. The method for dimming control in the present disclosure is particularly applicable to ACO-OFDM and its variations.

Figure 3:
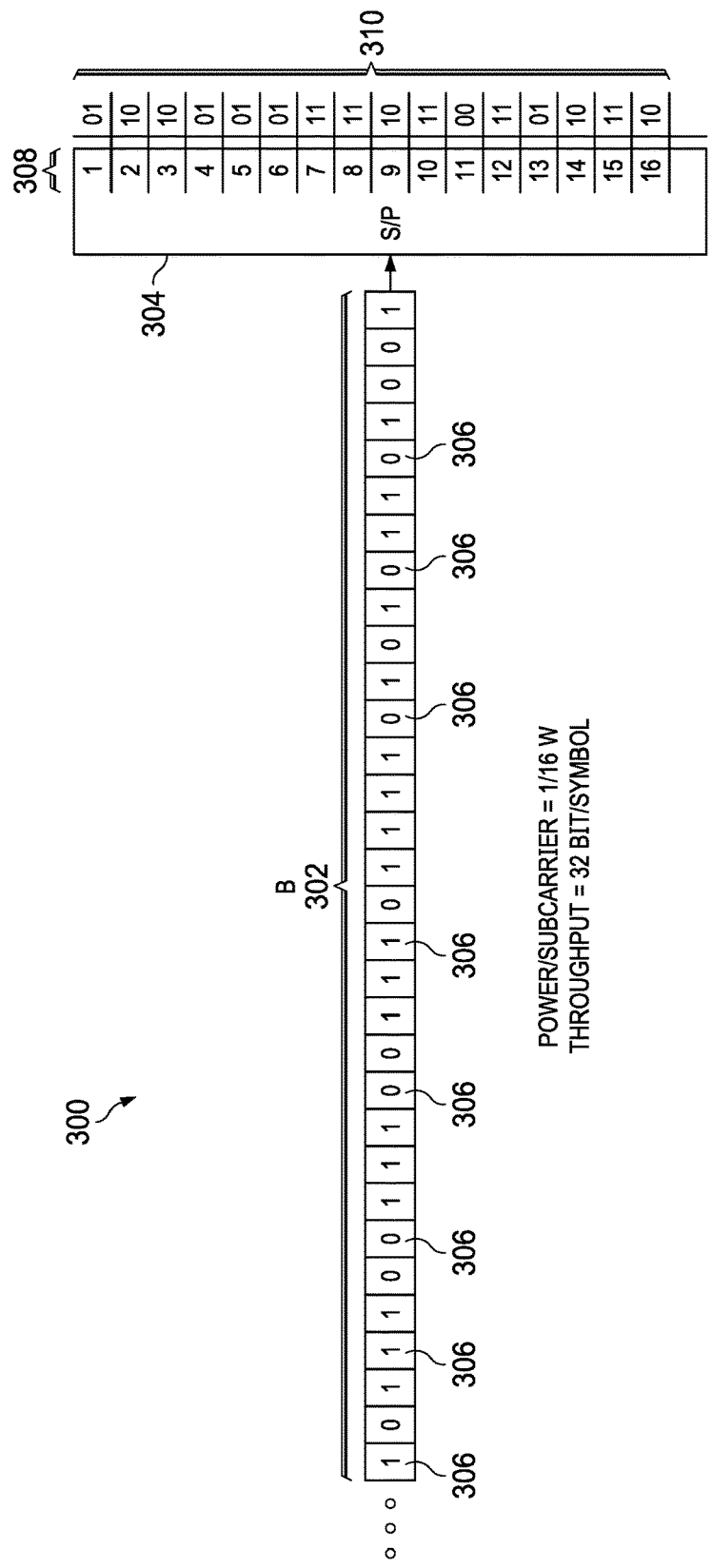
FIG. 3 illustrates a portion of a conventional orthogonal frequency division multiplexing (OFDM) system.

FIG. 3 illustrates a portion of a conventional OFDM system 300. As shown, a bitstream (B) 302 is input into a serial to parallel (S/P) converter 304. In FIG. 3, the bitstream 302 comprises a series of consecutive bits 306. Thus, the bits 306 are in a serial configuration. Each of the bits 306 in the bitstream 302 is a binary number (e.g., either a "1" or a "0"). The bitstream 302 in FIG. 3 includes a total of thirty-two bits. However, it should be appreciated that the bitstream 302 may contain more or fewer bits in practical applications.

The S/P convertor 304 converts the bits 306 from the serial configuration to a parallel configuration. In doing so, the S/P convertor 304 takes a pair of bits 306 from the bitstream 302 and aligns them with one of the sub-carriers, which are labeled "1" to "16," in an index of sub-carriers 308. For example, the first pair of bits 306 in the bitstream 302, which are "01" in FIG. 3, are associated with the first sub-carrier "1" in the index of sub-carriers 308, the second pair of bits 306 in the bitstream 302, which are "10" in FIG. 3, are associated with the second sub-carrier "2" in the index of sub-carriers 308, the third pair of bits 306 in the bitstream 302, which are "10" in FIG. 3, are associated with the third sub-carrier "3" in the index of sub-carriers 308, and so on until the final pair of bits 306 in the bitstream, which are "10" in FIG. 3, are associated with the last sub-carrier "16" in the index of sub-carriers 308. As shown in FIG. 3, the index of sub-carriers 308 includes a total of sixteen sub-carriers labeled "1" to "16." However, it should be appreciated that the index of sub-carriers 308 may contain more or fewer sub-carriers in practical applications. After the conversion from serial to parallel, the S/P convertor 304 outputs an OFDM symbol 310 comprising the pairs of bits 306 in the parallel configuration.

To illustrate the power per sub-carrier and throughput achieved by the conventional OFDM system 300, assume a total power of one watt (1 W), a 32-bit bitstream 302, and 16 sub-carriers in the index of sub-carriers 308. Based on that assumption, the power per sub-carrier is $\frac{1}{16}^{th}$ of a Watt and the throughput is 32 bits per symbol.

Figure 4:
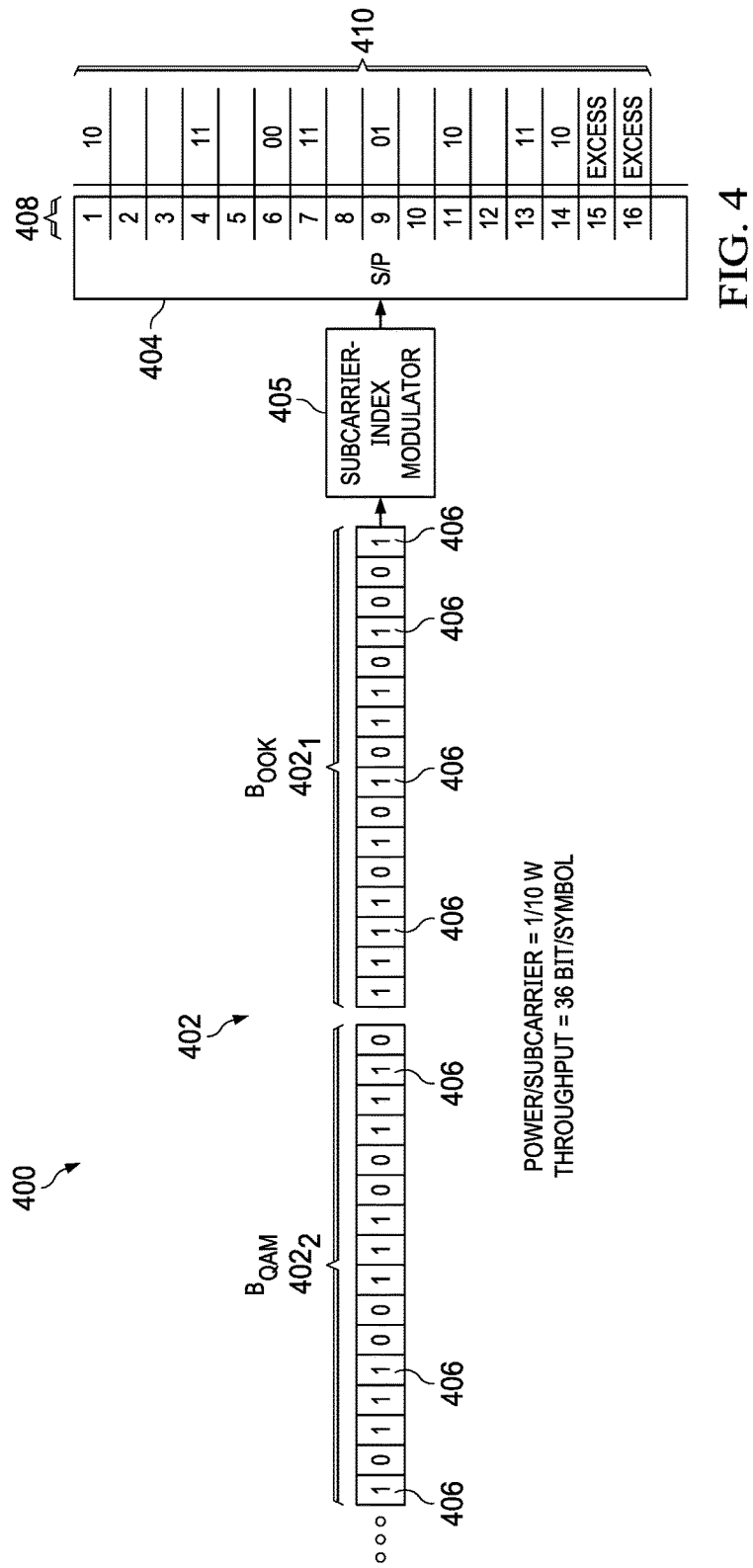
FIG. 4 illustrates a portion of a conventional OFDM system that takes advantage of sub-carrier index modulation (SIM).

FIG. 4 illustrates a portion of a conventional OFDM system 400 that takes advantage of sub-carrier index modulation (SIM). As before, a bitstream (B) 402 comprises a series of consecutive bits 406. Thus, the bits 406 are in a serial configuration. Each of the bits 406 in the bitstream 402 is a binary number (e.g., either a "1" or a "0"). The bitstream 402 in FIG. 4 includes a total of thirty-two bits 406. However, it should be appreciated that the bitstream 402 may contain more or fewer bits 406 in practical applications.

In FIG. 4, the bitstream 402 comprises an on/off key (OOK) portion $402_1$ and a QAM portion $402_2$. The OOK portion $402_1$ of the bitstream 402 is used to indicate to a sub-carrier index modulator 405 which of the sub-carriers (labeled 1-16) in the sub-carrier index 408 of the S/P convertor 404 are active. For example, the first bit 406 in the OOK portion $402_1$ of the bitstream 402 is a "1," which signifies that the first sub-carrier (labeled "1") is active. Therefore, the first pair of bits 406 from the QAM portion $402_2$ of the bitstream 402, which happen to be "10," are aligned with the first sub-carrier labeled "1" in the sub-carrier index 408. In contrast, the next bit 406 in the OOK portion $402_1$ of the bitstream 402 is a "0," which signifies that the second sub-carrier (labeled "2") is inactive. Because it is inactive, the sub-carrier does not contain any bits 406 from the QAM portion $402_2$ of the bitstream 402. By continuing in this fashion, a total of ten sub-carriers (labeled 1, 4, 6, 7, 9, 11, and 13-16) are identified as active. To summarize, the SIM technique employs the sub-carrier index to convey information in the OOK fashion.

In the example of FIG. 4, the QAM portion $402_2$ of the bitstream 402 only contains 16 bits 406. Therefore, only the first eight sub-carriers (labeled 1, 4, 6, 7, 9, 11, and 13-14) carry bits 406 from the QAM portion $402_2$ of the bitstream 402. The sub-carriers (labeled 15 and 16) are excess sub-carriers and are able to contain bits 406 from the next bitstream.

To illustrate the power per sub-carrier and throughput achieved by the OFDM system 400 using SIM, assume a total power of one watt (1 W) and a 32-bit bitstream 402. Here, only a total of ten sub-carriers in the index of sub-carriers 408 are active and carry bits 406. Therefore, the power per sub-carrier is $\frac{1}{10}^{th}$ of a Watt and the throughput is 36 bits per symbol. Therefore, OFDM with SIM provides advantages over conventional OFDM without SIM, which was shown in FIG. 3. While one example of OFDM with SIM provided in FIG. 4, it should be recognized that there are numerous other ways to implement OFDM with SIM in practical applications. The S/P convertor 404 outputs an OFDM symbol 410 comprising the pairs of bits 406 in the parallel configuration.

Figure 5:
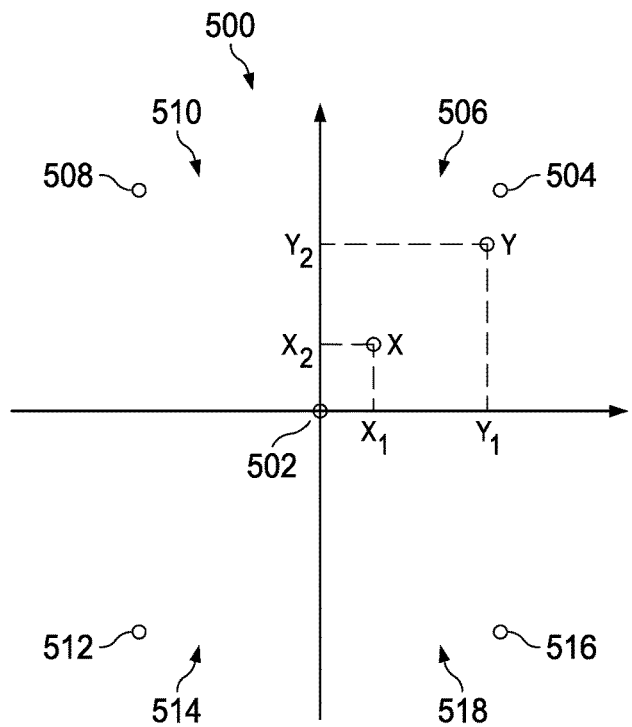
FIG. 5 illustrates a constellation diagram in SIM.

FIG. 5 illustrates a constellation diagram 500 in SIM. The constellation diagram 500 is a representation of a signal modulated by a digital modulation scheme such as QAM. In other words, the constellation diagram 500 may be used to represent a QAM symbol such as the QAM symbol transmitted by the S/P converter 404 of FIG. 4.

For the purpose of reference, the constellation diagram 500 includes an origin 502, a first point 504 in a top, right quadrant 506, a second point 508 in a top, left quadrant 510, a third point 512 in a bottom, left quadrant 514, and a fourth point 516 in a bottom, right quadrant 518.

Because of noise associated with OFDM with SIM, a receiver (not shown) needs to detect whether a sub-carrier was used. To illustrate the concept, consider "Y" at coordinates $y_1$, $y_2$ and "X" at coordinates $x_1$, $x_2$ in the constellation diagram 500. As shown, Y and X do not fall directly on the origin 502 or the constellation point in the first quadrant 504 due to the noise. However, because Y is closest to the constellation point in the first quadrant 504, the receiver is able to determine that Y corresponds to a used or active sub-carrier carrying bits 406 (i.e., carries energy). Likewise, because X is closest to the origin 502, the receiver is able to determine that X corresponds to an unused or inactive sub-carrier not carrying bits 406 (i.e., carries little or no energy). Because more information is transmitted on a used sub-carrier compared with conventional OFDM, a higher signal-to-noise ratio (SNR) is needed.

Keeping the above in mind, it is possible to provide dimming support with conventional OFDM in several different ways. For example, it is possible to provide dimming support with conventional OFDM by adjusting the amplitude of OFDM symbols. However, this method has drawbacks. For example, when the amplitude is too low communication becomes unreliable due to the low SNR. Therefore, this solution is not desirable.

Conventional OFDM is also able to provide dimming support by using, for example, either pulse-width modulation (PWM). However, these techniques also present drawbacks. For example, the dimming support is provided in the time domain (e.g., using a duty cycle due to the on-off period). Moreover, a DC bias is needed. In addition, while the method provides for good SNR, the spectral efficiency is relatively low.

Compared to OFDM without SIM, OFDM with SIM provides improved spectral efficiency. However, the SIM technique employs the sub-carrier index (e.g., sub-carrier index 408) to convey information in the OOK fashion. In addition, OFDM with SIM does not provide dimming support. Therefore, as will be more fully explained below, the present disclosure provides adaptive dimming support for OFDM-based VLC. The disclosed methods overcome the drawbacks of the conventional OFDM without SIM and OFDM with SIM.

Figure 6:
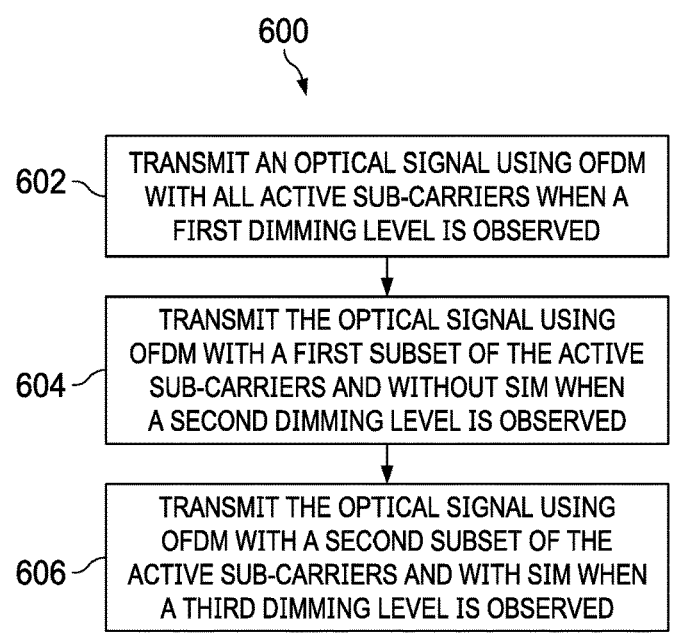
FIG. 6 illustrates a method of dimming control for OFDM-based VLC.

FIG. 6 illustrates a method 600 of dimming control for OFDM-based VLC. In an embodiment, the OFDM comprises ACO-OFDM. In an embodiment, the method 600 is implemented in by an optical transmission device (e.g., a dimmable LED circuit, a transmitter, a transceiver, a component of an OFDM system, etc.). In an embodiment, the method 600 is commenced when VLC transmission is desired. In block 602, an optical signal is transmitted by an optical transmission device using OFDM with all active sub-carriers when a first dimming level is observed. That is, all sub-carriers are active and used during the transmission.

In block 604, the optical signal is transmitted by the optical communication device using OFDM with a first subset of the active sub-carriers and without SIM when a second dimming level is observed. In such cases, the second dimming level is less than the first dimming level. In an embodiment, the first subset of the active sub-carriers comprises a maximum number of active sub-carriers ($n_a$), which will be more fully explained below.

In block 606, the optical signal is transmitted by the optical communication device using OFDM with a second subset of the active sub-carriers and with SIM when a third dimming level is observed. In such cases, the second subset of the active sub-carriers is smaller than the first subset of the active sub-carriers. In addition, the third dimming level is less than the second dimming level. In an embodiment, the second subset of the active sub-carriers comprises an equivalent number of sub-carriers ($n_e$), which will be more fully explained below. Again, despite using only a first subset or a second subset of the active sub-carriers, reliable communication is still achieved. Therefore, method 600 is adapted to provide an adaptive dimming level to maintain reliable communication.

Figure 7:
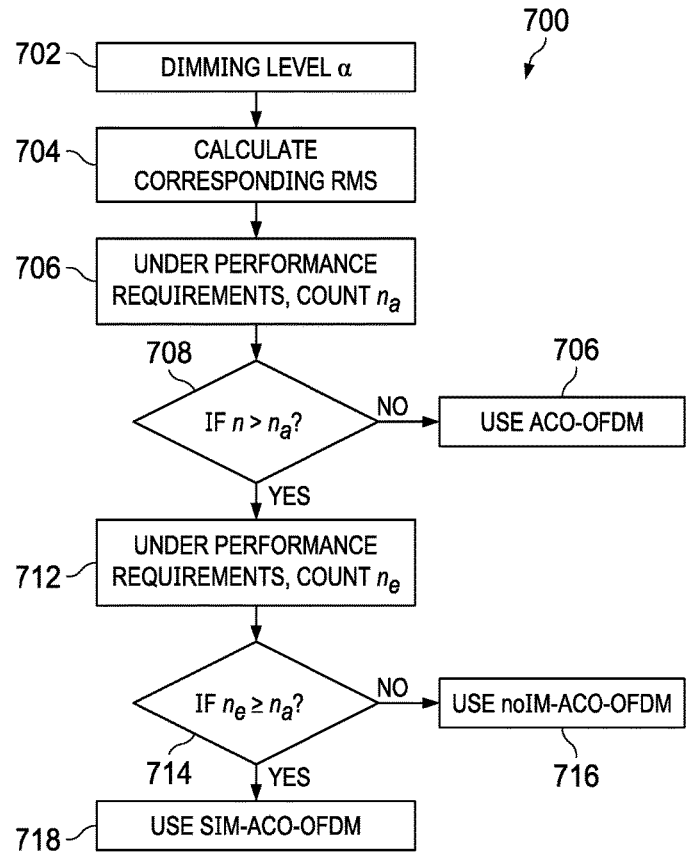
FIG. 7 illustrates a method of dimming control for OFDM-based VLC.

FIG. 7 illustrates a method 700 of dimming control for OFDM-based VLC. In an embodiment, the OFDM comprises ACO-OFDM. In an embodiment, the method 700 is implemented by an optical transmission device (e.g., a dimmable LED circuit, a transmitter, a transceiver, a component of an OFDM system, etc.). In an embodiment, the method 700 is commenced when VLC transmission is desired. In block 702, a dimming level (a) is observed. In an embodiment, the dimming level is observed by monitoring, for example, a dimming switch or circuit.

In block 704, a RMS of a signal power is determined for each sub-carrier of an optical signal based on the observed dimming level. In an embodiment, the RMS of the signal power is calculated as follows:

In block 706, a maximum number of active sub-carriers ($n_a$) is determined using the RMS of the signal power for a given BER and a given QAM size. In an embodiment, the maximum number of active sub-carriers is calculated as follows.

$$r = \sqrt{\frac{1}{n}\sum_{m=1}^{n}|x_m|^2}$$

where n is the number of all subcarriers and $x_m$ is the QAM symbol on the mth sub-carrier for $1 \le m \le n$.

The signal power on each sub-carrier can be expressed as:

$$\sigma^2 = \frac{r^2 n}{2n_a}$$

where r is the RMS of the signal power, n the number of all subcarriers, and $n_a$ the number of active subcarriers. The SNR threshold for reliable communication (e.g., for certain BER) is denoted by $\gamma$. The noise power is represented as $N_0$. Therefore, $$\frac{\sigma^2}{N_0} \ge \gamma$$

The relationship between the BER and the SNR, which is denoted by $\Gamma_{b(elec)}$, for an M-QAM symbol can be expressed as:

$$BER = \frac{4(\sqrt{M}-1)}{\sqrt{M}\log_2(M)} Q\left(\sqrt{\frac{3\log_2(M)}{M-1}\Gamma_{b(elec)}}\right) + \frac{4(\sqrt{M}-2)}{\sqrt{M}\log_2(M)} Q\left(3\sqrt{\frac{3\log_2(M)}{M-1}\Gamma_{b(elec)}}\right)$$

The SNR threshold is given by:

$$\gamma = \Gamma_{b(elec)}\log_2(M)$$

which needs to satisfy:

$$\frac{r^2 n}{2n_a N_0} \ge \gamma \Rightarrow n_a \le \left\lfloor\frac{r^2 n}{2N_0 \gamma}\right\rfloor$$

Thus, the maximum number of active subcarriers is determined by the expression:

$$n_a = \min\left\{\left\lfloor\frac{r^2 n}{2N_0 \gamma}\right\rfloor, n\right\}$$

In block 708, a total number of sub-carriers (n) is compared to the maximum number of active sub-carriers ($n_a$). If the total number of sub-carriers is not greater than the maximum number of active sub-carriers, then the optical signal is transmitted using OFDM with all active sub-carriers in block 710. In an embodiment, the optical signal is transmitted using ACO-OFDM.

If the total number of sub-carriers is greater than the maximum number of active sub-carriers, then in block 712 an equivalent number of sub-carriers ($n_e$) is determined assuming that SIM will be used. In an embodiment, the equivalent number of sub-carriers is calculated as follows.

If the signal power is limited, the number of active sub-carriers may be reduced in order to maintain reliable communication. However, fewer active sub-carriers lead to lower spectral efficiency. To improve the spectral efficiency of OFDM with decreased sub-carriers, SIM is used. A receiver first detects which subcarriers are active before demodulating the QAM symbols on the active sub-carriers. This is equivalent to adding an extra constellation point (e.g., the origin) in the original QAM constellation on each sub-carrier. To achieve the same performance as OFDM using the same set of sub-carriers without SIM, a higher SNR threshold (denoted by $\gamma_I$) is used on each subcarrier. The number of active sub-carriers in OFDM with SIM is given by:

$$n_I = \min\left\{\left\lfloor\frac{r^2 n}{2N_0 \gamma_I}\right\rfloor, n\right\}$$

Let $b_I$ denote the increased bit rate due to SIM. The equivalent number of sub-carriers is:

$$n_e = n_I + \frac{b_I}{\log_2(M)}$$

where $n_I$ is an increased number of active sub-carriers in OFDM with SIM, and M is a QAM size.

In block 714, the maximum number of active sub-carriers ($n_a$) without SIM is compared to the equivalent number of sub-carriers ($n_e$). If the equivalent number of sub-carriers is not greater than or equal to the maximum number of active sub-carriers, the optical signal is transmitted using OFDM with the maximum number of active sub-carriers and without SIM in block 716 (a.k.a., no index modulation ACO-OFDM, or simply noIM-ACO-OFDM). If the equivalent number of sub-carriers is greater than the maximum number of active sub-carriers, the optical signal is transmitted using OFDM with SIM in block 718.

The number of active sub-carriers is communicated from the transmitter to the receiver by certain means (e.g., via the framing overhead). If all sub-carriers are active, then the number n is communicated. If a subset of sub-carriers is active and SIM is not used, then the number $n_a$ is communicated. If a subset of sub-carriers is active and SIM is used, then the number $n_f$ is communicated.

Figure 8:
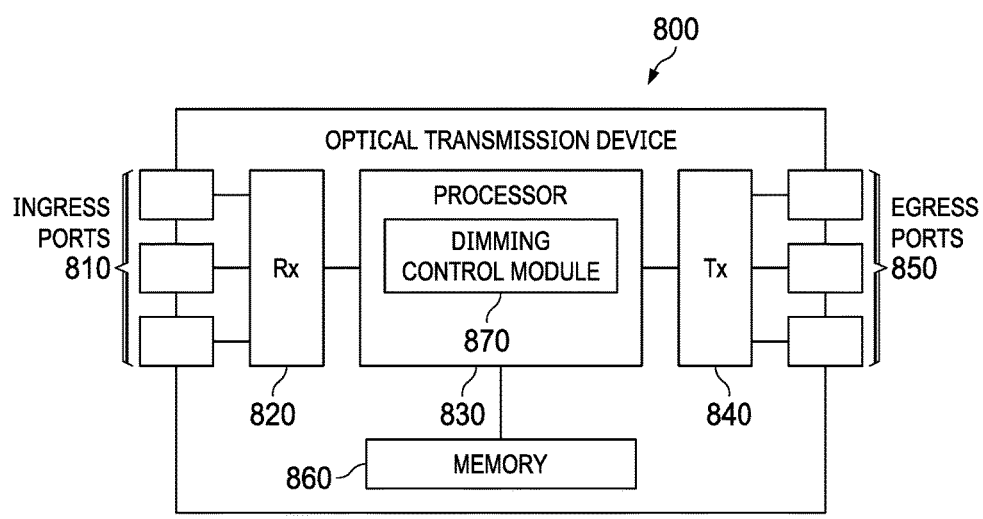
FIG. 8 is a schematic diagram of an optical transmission device.

FIG. 8 is a schematic diagram of an optical transmission device 800 according to an embodiment of the disclosure. The optical transmission device 800 is suitable for implementing the disclosed embodiments as described herein. In an embodiment, the optical transmission device 800 may be a dimmable LED circuit, a transmitter, a transceiver, or a receiver. The optical transmission device 800 comprises ingress ports 810 and receiver units (Rx) 820 for receiving data; a processor, logic unit, or central processing unit (CPU) 830 to process the data; transmitter units (Tx) 840 and egress ports 850 for transmitting the data; and a memory 860 for storing the data. The optical transmission device 800 may also comprise optical-to-electrical (OE) components and electrical-to-optical (EO) components coupled to the ingress ports 810, the receiver units 820, the transmitter units 840, and the egress ports 850 for egress or ingress of optical or electrical signals.

The processor 830 is implemented by hardware and software. The processor 830 may be implemented as one or more CPU chips, cores (e.g., as a multi-core processor), field-programmable gate arrays (FPGAs), application specific integrated circuits (ASICs), and digital signal processors (DSPs). The processor 830 is in communication with the ingress ports 810, receiver units 820, transmitter units 840, egress ports 850, and memory 860. The processor 830 comprises a dimming control module 870. The dimming control module 870 implements the disclosed embodiments described above. For instance, the dimming control module 870 observes a dimming level, compares sub-carriers, performs calculations, and so on. The inclusion of the dimming control module 870 therefore provides a substantial improvement to the functionality of the optical transmission device 800 and effects a transformation of the optical transmission device 800 to a different state. Alternatively, the dimming control module 870 is implemented as instructions stored in the memory 860 and executed by the processor 830.

The memory 860 comprises one or more disks, tape drives, and solid-state drives and may be used as an overflow data storage device, to store programs when such programs are selected for execution, and to store instructions and data that are read during program execution. The memory 860 may be volatile and/or non-volatile and may be read-only memory (ROM), random access memory (RAM), ternary content-addressable memory (TCAM), and/or static random-access memory (SRAM).

FIG. 9 is a graph 900 that illustrates how BER 902 compares to RMS of signal power 904. For the purpose of illustration, a baseline 905 for the BER 902 is depicted at $10^{-3}$. A first curve 906 illustrates how the BER 902 varies with the RMS of signal power 904 when ACO-OFDM with all sub-carriers is employed (e.g., block 710 in FIG. 7). As shown, the first curve 906 intersects the baseline 905 at an RMS of signal power 904 of about 1. A second curve 908 illustrates how the BER 902 varies with the RMS of signal power 904 when ACO-OFDM with the maximum number of active sub-carriers and without SIM is employed (e.g., block 716 in FIG. 7). A third curve 910 illustrates how the BER 902 varies with the RMS of signal power 904 when ACO-OFDM with SIM is employed (e.g., block 718 in FIG. 7). As shown, the BER 902 remains below the baseline 905 over the entire range of RMS of signal power 904 for curves 908 and 910.

FIG. 10 is a graph 1000 that illustrates how spectral efficiency 1002 compares to RMS of signal power 1004 for different modulation schemes. A first curve 1005 (which is generally linear) illustrates that for ACO-OFDM with all sub-carriers the spectral efficiency 1002 stays relatively steady at about 0.25 over the entire range of the RMS of signal power 1004. A second curve 1006 illustrates that for ACO-OFDM with the maximum number of active sub-carriers and without SIM the spectral efficiency 1002 generally increases as the RMS of signal power 1004 approaches about 1. A third curve 1008 illustrates that for ACO-OFDM with SIM the spectral efficiency 1002 generally increases as the RMS of signal power 1004 approaches about 1.

From the foregoing, it should be recognized that the dimming control methods disclosed herein offer significant advantages. For example, the methods provide improved spectral efficiency and support a fine resolution of dimming. In addition, on-line reconfiguration (OLR) is not needed because, except for the number of active sub-carriers, no other transmission parameters are reconfigured when a dimming level is changed. Further, the cost/complexity associated with implementing SIM at the transmitter-side of an OFDM system is relatively low, and the cost/complexity associated with implementing SIM at the transmitter-side of an OFDM system is moderate.

In an embodiment, the disclosure includes dimming control for orthogonal frequency division multiplexing (OFDM)-based visible light communication (VLC). The dimming control includes means for transmitting an optical signal using OFDM with all active sub-carriers when a first dimming level is observed; means for transmitting the optical signal using OFDM with a first subset of active sub-carriers and without sub-carrier index modulation (SIM) when a second dimming level is observed, wherein the second dimming level is less than the first dimming level; and means for transmitting the optical signal using OFDM with a second subset of active sub-carriers and with SIM when a third dimming level is observed, wherein the second subset of the active sub-carriers is smaller than the first subset of the active sub-carriers, and wherein the third dimming level is less than the second dimming level.

In an embodiment, the disclosure includes dimming control for orthogonal frequency division multiplexing (OFDM)-based visible light communication (VLC). The dimming control includes means for determining a root mean square (RMS) of a signal power for each sub-carrier of an optical signal based on an observed dimming level; means for determining a maximum number of active sub-carriers ($n_a$) using the RMS of the signal power for a given bit error rate (BER) and a given quadrature amplitude modulation (QAM) size; means for transmitting the optical signal using OFDM with all the active sub-carriers when a total number of sub-carriers (n) is not greater than the maximum number of active sub-carriers ($n_a$); means for determining an equivalent number of sub-carriers ($n_e$) assuming use of sub-carrier index modulation (SIM) when the total number of sub-carriers (n) is greater than the maximum number of active sub-carriers ($n_a$); transmitting the optical signal using OFDM with the maximum number of active sub-carriers ($n_a$) and without SIM when the equivalent number of sub-carriers ($n_e$) is greater than the maximum number of active sub-carriers ($n_a$); and means for transmitting the optical signal using OFDM with SIM when the equivalent number of sub-carriers ($n_e$) is less than the maximum number of active sub-carriers ($n_a$).

In an embodiment, the disclosure includes an optical transmission apparatus. The optical transmission apparatus includes processor means configured to: determine a root mean square (RMS) of a signal power for each sub-carrier of an optical signal based on an observed dimming level; determine a maximum number of active sub-carriers ($n_a$) using the RMS of the signal power for a given bit error rate (BER) and a given quadrature amplitude modulation (QAM) size; and determine an equivalent number of sub-carriers ($n_e$) assuming use of sub-carrier index modulation (SIM) when a total number of sub-carriers (n) is greater than the maximum number of active sub-carriers ($n_a$); and transmitter means coupled to the processor means, the transmitter means configured to: transmit the optical signal using orthogonal frequency division multiplexing (OFDM) with all the active sub-carriers when the total number of sub-carriers (n) is not greater than the maximum number of active sub-carriers ($n_a$); transmit the optical signal using OFDM with the maximum number of active sub-carriers ($n_a$) and without SIM when the equivalent number of sub-carriers ($n_e$) is greater than or equal to the maximum number of active sub-carriers ($n_a$); and transmit the optical signal using OFDM with SIM when the equivalent number of sub-carriers ($n_e$) is less than the maximum number of active sub-carriers ($n_a$).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of dimming control for orthogonal frequency division multiplexing (OFDM)-based visible light communication (VLC), comprising:
   transmitting, by an optical communication device, an optical signal using OFDM with all active sub-carriers when a first dimming level is observed;
   transmitting, by the optical communication device, the optical signal using OFDM with a first subset of active sub-carriers and without sub-carrier index modulation (SIM) when a second dimming level is observed, wherein the second dimming level is less than the first dimming level; and
   transmitting, by the optical communication device, the optical signal using OFDM with a second subset of active sub-carriers and with SIM when a third dimming level is observed, wherein the second subset of the active sub-carriers is smaller than the first subset of the active sub-carriers, and wherein the third dimming level is less than the second dimming level.

2. The method of claim 1, wherein the optical communication device comprises a dimmable light-emitting diode (LED).

3. The method of claim 1, wherein the OFDM comprises asymmetrically clipped optical (ACO)-OFDM.

4. The method of claim 1, wherein the first subset of the active sub-carriers comprises a maximum number of active sub-carriers ($n_a$).

5. The method of claim 1, wherein the second subset of the active sub-carriers comprises an equivalent number of sub-carriers ($n_e$).

6. A method of dimming control for orthogonal frequency division multiplexing (OFDM)-based visible light communication (VLC), comprising:
   determining a root mean square (RMS) of a signal power for each sub-carrier of an optical signal based on an observed dimming level;
   determining a maximum number of active sub-carriers ($n_a$) using the RMS of the signal power for a given bit error rate (BER) and a given quadrature amplitude modulation (QAM) size;
   transmitting the optical signal using OFDM with all the active sub-carriers when a total number of sub-carriers (n) is not greater than the maximum number of active sub-carriers ($n_a$);
   determining an equivalent number of sub-carriers ($n_e$) assuming use of sub-carrier index modulation (SIM) when the total number of sub-carriers (n) is greater than the maximum number of active sub-carriers ($n_a$);
   transmitting the optical signal using OFDM with the maximum number of active sub-carriers ($n_a$) and without SIM when the equivalent number of sub-carriers ($n_e$) is greater than the maximum number of active sub-carriers ($n_a$); and
   transmitting the optical signal using OFDM with SIM when the equivalent number of sub-carriers ($n_e$) is less than the maximum number of active sub-carriers ($n_a$).

7. The method of claim 6, wherein the maximum number of active sub-carriers ($n_a$) is determined according to:

$$n_a = \min\left\{\left\lfloor\frac{r^2 n}{2N_0 \gamma}\right\rfloor, n\right\}$$

where r is the RMS of the signal power, n is the total number of sub-carriers, $N_0$ is a noise power, and $\gamma$ is a signal to noise ratio (SNR) threshold for the given BER.

8. The method of claim 6, wherein the equivalent number of sub-carriers ($n_e$) is determined according to:

$$n_e = n_I + \frac{b_I}{\log_2(M)}$$

where $n_I$ is an increased number of active sub-carriers in OFDM with SIM, $b_I$ is an increased bitrate due to SIM, and M is a QAM size.

9. The method of claim 8, wherein the increased number of active sub-carriers in OFDM with SIM is determined according to:

$$n_I = \min\left\{\left\lfloor\frac{r^2 n}{2N_0 \gamma_I}\right\rfloor, n\right\}$$

where r is the RMS of the signal power, n is the total number of sub-carriers, $N_0$ is a noise power, and $\gamma_I$ is an increased SNR threshold.

10. The method of claim 6, wherein the signal power for each sub-carrier of the optical signal is determined according to:

$$\sigma^2 = \frac{r^2 n}{2 n_a}$$

where r is the RMS of the signal power, n is a number of all sub-carriers, and $n_a$ is the maximum number of active sub-carriers.

11. The method of claim 6, wherein only the active sub-carriers carry bits of data.

12. The method of claim 6, wherein the OFDM used for transmission of the optical signal comprises asymmetrically clipped optical (ACO)-OFDM.

13. The method of claim 6, wherein the optical signal is transmitted by a dimmable light-emitting diode (LED).

14. The method of claim 6, further comprising identifying, for a receiver configured to receive the optical signal, a number of the active sub-carriers being used.

15. An optical transmission apparatus, comprising:
a processor configured to:
determine a root mean square (RMS) of a signal power for each sub-carrier of an optical signal based on an observed dimming level;
determine a maximum number of active sub-carriers ($n_a$) using the RMS of the signal power for a given bit error rate (BER) and a given quadrature amplitude modulation (QAM) size; and
determine an equivalent number of sub-carriers ($n_e$) assuming use of sub-carrier index modulation (SIM) when a total number of sub-carriers (n) is greater than the maximum number of active sub-carriers ($n_a$); and
a transmitter coupled to the processor, the transmitter configured to:
transmit the optical signal using orthogonal frequency division multiplexing (OFDM) with all the active sub-carriers when the total number of sub-carriers (n) is not greater than the maximum number of active sub-carriers ($n_a$);
transmit the optical signal using OFDM with the maximum number of active sub-carriers ($n_a$) and without SIM when the equivalent number of sub-carriers ($n_e$) is greater than or equal to the maximum number of active sub-carriers ($n_a$); and
transmit the optical signal using OFDM with SIM when the equivalent number of sub-carriers ($n_e$) is less than the maximum number of active sub-carriers ($n_a$).

16. The optical transmission apparatus of claim 15, wherein the optical transmission apparatus comprises one of a visible light communication (VLC) apparatus and a dimmable light-emitting diode (LED).

17. The optical transmission apparatus of claim 15, wherein the optical signal is transmitted to a photodetector, a light sensor, a photodiode, an image sensor, or a matrix of photodiodes along with an indication of a number of the active sub-carriers being used in the optical signal.

18. The optical transmission apparatus of claim 15, wherein the equivalent number of sub-carriers ($n_e$) is determined according to:

$$n_e = n_I + \frac{b_I}{\log_2(M)}$$

where $n_I$ is an increased number of active sub-carriers in OFDM with SIM, $b_I$ is an increased bitrate due to SIM, and M is a QAM size.

19. The optical transmission apparatus of claim 18, wherein the increased number of active sub-carriers in OFDM with SIM is determined according to:

$$n_I = \min\left\{\left\lfloor\frac{r^2 n}{2N_0 \gamma_I}\right\rfloor, n\right\}$$

where r is the RMS of the signal power, n is the total number of sub-carriers, $N_0$ is a noise power, and $\gamma_I$ is an increased signal to noise ratio (SNR) threshold.

20. The optical transmission apparatus of claim 18, wherein the total number of sub-carriers (n) is transmitted by the transmitter to a receiver when all of the sub-carriers are active, wherein the maximum number of active sub-carriers ($n_a$) is transmitted by the transmitter to the receiver when a subset of the sub-carriers is active and SIM is not used, and wherein the increased number of active sub-carriers ($n_I$) is transmitted by the transmitter to the receiver when a subset of the sub-carriers is active and SIM is used.

* * * * *